United States Patent [19]

Chen et al.

[11] Patent Number: 5,035,818
[45] Date of Patent: Jul. 30, 1991

[54] AMIDE AND SULFONIC ACID DERIVATION OF LOWER OLEFIN OLIGOMERS

[75] Inventors: Catherine S. H. Chen, Berkley Heights; Paul G. Rodewald, Rocky Hill, both of N.J.

[73] Assignee: Mobil Oil Corporation, Fairfax, Va.

[21] Appl. No.: 476,082

[22] Filed: Feb. 7, 1990

[51] Int. Cl.$^5$ ................. C10M 135/10; C10M 105/72
[52] U.S. Cl. .................................... 252/47.5; 558/47; 558/49
[58] Field of Search .................... 558/47, 49; 252/47.5

[56] References Cited

U.S. PATENT DOCUMENTS

| | | | |
|---|---|---|---|
| 4,098,710 | 7/1978 | Elliott et al. | 252/55 |
| 4,292,185 | 9/1981 | Bollinger | 252/47.5 |
| 4,317,738 | 3/1982 | Spence | 252/55 |
| 4,520,221 | 5/1985 | Chen | 585/517 |
| 4,568,786 | 2/1986 | Chen et al. | 585/517 |
| 4,658,079 | 4/1987 | Chen | 585/517 |

OTHER PUBLICATIONS

Ritter, J. J. et al., "A New Reaction of Nitriles", JACS, vol. 70, 4045 (1948).
Ritter, J. J., "A Novel Method for the Prep. of Dimethylneopentylcarbinol", JACS, vol. 70, 4253 (1948).
Plaut, H. et al., "A New Reaction of Nitriles", JACS, vol. 73, 4076 (1951).
"Organic Reactions", vol. 17, Chapter 3, The Ritter Reaction, pp. 213–325, Krimen et al.

*Primary Examiner*—Prince E. Willis
*Assistant Examiner*—Ellen McAvoy
*Attorney, Agent, or Firm*—Alexander J. McKillop; Charles J. Speciale; Malcolm D. Keen

[57] ABSTRACT

Oligomers produced from lower alkenes by acidic zeolite catalyzed oligomerization can be converted to useful lubricant additives or lubricants by amidation and sulfonation of olefinic bonds in the oligomers by reaction with nitriles in the presence of strong acid catalyst whereby oligomer derivatives containing amide groups and sulfonic acid groups are produced. The products so produced from $C_{20}+$ olefins exhibit favorable qualities as lubricants. The discovery is particularly applicable to the amidation and sulfonation of oligomers produced from lower olefins such as propylene by oligomerization using a ZSM-5 catalyst which has been surface deactivated.

5 Claims, No Drawings

AMIDE AND SULFONIC ACID DERIVATION OF LOWER OLEFIN OLIGOMERS

This invention relates to processes for the amidation and sulfonation of oligomers of lower olefins and to the products produced thereby exhibiting lubricant properties and lubricant additive qualities. In particular, the invention relates to the strong acid catalyzed reaction between alkyl nitriles and olefinic oligomers obtained by oligomerization of lower olefins by zeolite catalysis to produce novel functionalized lubricants or additives having high viscosity index and low pour point. The invention further relates to mixtures of these novel oligomers with mineral oil and synthetic lubricant systems and their utilization as additives for lubricant compositions.

BACKGROUND OF THE INVENTION

Recent work in the field of olefin upgrading has resulted in a catalytic process for converting lower olefins to heavier hydrocarbons. Heavy distillate and lubricant range hydrocarbons can be synthesized over ZSM-5 type catalysts at elevated temperature and pressure to provide a product having substantially linear molecular conformations due to the ellipsoidal shape selectivity of certain medium pore catalysts.

Conversion of olefins to gasoline and/or distillate products is disclosed in U.S. Pat. Nos. 3,960,978 and 4,021,502 (Givens, Plank and Rosinski) wherein gaseous olefins in the range of ethylene to pentene, either alone or in admixture with paraffins are converted into an olefinic gasoline blending stock by contacting the olefins with a catalyst bed made up of a ZSM-5 type zeolite. Particular interest is shown in a technique developed by Garwood, et al., as disclosed in European patent application No. 83301391.5, published Sept. 29, 1983. In U.S. Pat. Nos. 4,150,062; 4,211,640 and 4,227,992 Garwood, et al., disclose the operating conditions for the Mobil Olefin to Gasoline/Distillate (MOGD) process for selective conversion of $C_3+$ olefins to mainly aliphatic hydrocarbons.

In the process for catalytic conversion of olefins to heavier hydrocarbons by catalytic oligomerization using a medium pore shape selective acid crystalline zeolite, such as ZSM-5 type catalyst, process conditions can be varied to favor the formation of hydrocarbons of varying molecular weight. At moderate temperature and relatively high pressure, the conversion conditions favor $C_{10}+$ aliphatic product Lower olefinic feedstocks containing $C_2$-$C_8$ alkenes may be converted; however, the distillate mode conditions do not convert a major fraction of ethylene. A typical reactive feedstock consists essentially of $C_3$-$C_6$ mono-olefins, with varying amounts of nonreactive paraffins and the like being acceptable components.

U.S. Pat. Nos. 4,520,221; 4,568,786; and 4,658,079 to C. S. H. Chen, et al., incorporated herein by reference in their entirety, disclose further advances in zeolite catalyzed olefin oligomerization. These patents disclose processes for the preparation of high viscosity index lubricant range hydrocarbons by oligomerization of light olefins using zeolite catalyst such as ZSM-5. The oligomers so produced are essentially linear in structure and contain olefin unsaturation. These unique olefinic oligomers are produced by surface deactivation of the ZSM-5 type catalyst by pretreatment with a surface-neutralizing base.

The formulation of lubricants typically includes an additive package incorporating a variety of chemicals to improve or protect lubricant properties in application specific situations, particularly internal combustion engine and machinery applications. The more commonly used additives include oxidation inhibitors, rust inhibitors, antiwear agents, pour point depressants, detergent-dispersants, viscosity index (VI) improvers, foam inhibitors and the like. This aspect of the lubricant arts is specifically described in Kirk-Othmer "Encyclopedia of Chemical Technology", 3rd edition, Vol. 14, pp. 477-526, incorporated herein by reference. The inclusion of additives in lubricants provides a continuing challenge to workers in the field to develop improved additives of increased compatibility with the lubricant and other additives or new additives containing a multifunctional capability that can reduce the number of additives required in the formulation.

The olefinic character of the lower olefin oligomers produced by the aforenoted ZSM-5 catalyzed processes of Chen, et al., provides a reactive site to modify those unique oligomers to produce derivatives that can exhibit lube additive properties or improvements in lubricant characteristics such as a reduction in volatility. Known derivation reactions of conventional olefins include amidation and sulfonation. In particular, it is known that in the presence of a strong acid catalyst alkyl nitriles react by addition to olefin bonds to form amides. The reaction, known as the Ritter reaction, was first described by J. J. Ritter and P. P. Mineri in the "Journal of the American Chemical Society", 70, 4045 (1948). The reaction is described in greater detail by L. I. Krimen and J. Cotta in "Organic Reactions", Vol. 17, pages 213-325, incorporated herein by reference in its entirety.

In view of the well recognized efficacy of imides such as alkenyl succinimides and some sulfonates to influence lubricant properties as additives thereto, the novel olefins of Chen, et al., in combination with Ritter chemistry can provide novel derivates with useful lubricant and lubricant additive properties.

Accordingly, it is an object of the present invention to provide a process for the amidation and sulfonation of olefins or alkenes produced by the zeolite catalyzed olgmerization of lower olefins or alkenes.

It is another object of the present invention to provide novel lubricant additives and lubricants by the amidation and sulfonation of olefin oligomers produced from lower olefins by surface deactivated zeolite catalysts.

Yet another object of the instant invention is to provide novel lubricant mixtures from mineral oil and synthetic lubricants derived from polyalphaolefins and containing amide groups and sulfonate groups olefin oligomers.

SUMMARY OF THE INVENTION

It has been discovered that the oligomers produced from lower alkenes or olefins by acidic zeolite catalyzed oligomerization can be converted to useful lubricant additives or lubricants by amidation and sulfonation of olefinic bonds in the oligomers, whereby oligomers containing amide groups and sulfonic acid groups are produced. The products so produced from $C_{20}+$ olefins exhibit favorable lubricant qualities of high viscosity index and low pour points. The discovery is particularly applicable to the amidation and sulfonation of oligomers produced from lower olefins such as propylene by oligomerization using ZSM-5 catalyst which has been surface deactivated.

More particularly, an amidation and sulfonation reaction product has been discovered containing amide and sulfonic acid groups. The product is made by reacting an alkene oligomer and an alkylnitrile in contact with sulfuric acidic catalyst under amidation and sulfonation reaction conditions. The alkene oligomer starting material comprises the oligomerization product of lower alkene oligomerized in contact with medium pore, shape selective metallosilicate catalyst under oligomerization conditions. The product comprises a liquid lubricant containing $C_{20}+$ carbon atoms and having a viscosity at 100° C. greater than 2cS and viscosity index measured at 100° C. greater than 75.

The invention further comprises a process for the production of liquid lubricant or lubricant additive comprising contacting a mixture comprising an alkylnitrile and alkene oligomer containing greater than twenty carbon atoms with sulfuric acid catalyst under amidation and sulfonation reaction conditions wherein the alkene oligomer comprises the oligomerization product of lower alkene oligomerized in contact with medium pore, shape selective metallosilicate catalyst under oligomerization conditions. Separating of the reaction product results in recovery of liquid lubricant or additive containing amide and sulfonic acid groups.

The discovery has also been made that an amidation reaction product containing only amide groups is produced by reacting an alkene oligomer and an alkylnitrile in contact with strong acidic catalyst comprising $BF_3 \cdot H_2O$, rather then sulfuric acid, under amidation reaction conditions. The alkene oligomer starting material comprises the aforementioned oligomerization product.

The invention also pertains to liquid lubricant compositions comprising a mixture of a liquid hydrocarbon lubricant and the lubricant additive made according to the foregoing process. The mixtures may further contain lubricant additives taken from the group consisting of dispersants, detergents, viscosity index improvers, extreme pressure/antiwear additives, antioxidants, pour point depressants, emulsifiers, demulsifiers, corrosion inhibitors, antirust inhibitors, antistaining additives, friction modifiers, and the like.

DETAIL DESCRIPTION OF THE INVENTION

The olefin oligomers used as starting material in the present invention are prepared from $C_2-C_{10}$ olefins according to the methods presented by Chen, et al., in the aforementioned patents cited and incorporated as references. Shape-selective oligomerization, as it applies to conversion of $C_2-C_{10}$ olefins over ZSM-5, is known to produce higher olefins up to $C_{30}$ and higher. Reaction conditions favoring higher molecular weight products are low temperature (200-260° C.), elevated pressure (about 2000 kPa or greater) and long contact times (less than 1 WHSV). The reaction under these conditions proceeds through the acid catalyzed steps of oligomerization, isomerization-cracking to a mixture of intermediate carbon number olefins, and interpolymerization to give a continuous boiling product containing all carbon numbers. The channel system of ZSM-5 type catalysts impose shape selective constraints on the configuration of large molecules, accounting for the differences with other catalysts.

The shape-selective oligomerization/polymerization catalysts preferred for use herein to prepare the olefin oligomers used as starting material in the invention include the crystalline aluminosilicate zeolites having a silica to alumina molar ratio of at least 12, a constraint index of about 1 to 12 and acid cracking activity of about 50-300. Representative of the ZSM-5 type zeolites are ZSM-5, ZSM-11, ZSM-12, ZSM-23, ZSM-35 and ZSM-38. ZSM-5 is disclosed and claimed in U.S. Pat No. 3,702,886 and U.S. Pat. No. 29,948; ZSM-11 is disclosed and claimed in U.S. Pat. No. 3,709,979. Also, see U.S. Pat. Nos. 3,832,449 for ZSM-12; 4,076,842 for ZSM-23; 4,016,245 for ZSM-35 and 4,046,839 for ZSM-38. The disclosures of these patents are incorporated herein by reference. A suitable shape selective medium pore catalyst for fixed bed is a small crystal H-ZSM-5 zeolite (silica:alumina ratio = 70:1) with alumina binder in the form of cylindrical extrudates of about 1-5mm. Unless otherwise stated in this description, the catalyst shall consist essentially of ZSM-5, which has a crystallite size of about 0.02 to 0.05 micron. Other pentasil catalysts which may be used in one or more reactor stages include a variety of medium pore siliceous material disclosed in U.S. Pat. Nos. 4,414,423 and 4,417,088, incorporated herein by reference.

The acid catalysts are deactivated by pretreatment with a surface-neutralizing base, as disclosed by Chen in the patents incorporated by reference.

Considering propylene oligomerization for purposes of illustration, the olefinic oligomerization-polymerization products include $C_{10}+$ substantially linear aliphatic hydrocarbons. The ZSM-5 catalytic path for propylene feed provides a long chain with approximately one lower alkyl (e.g., methyl) substituent per 8 or more carbon atoms in the straight chain. The lubricant range product can be depicted as a typical linear molecule having a sparingly-substituted long carbon chain with some olefinic unsaturation.

Olefinic oligomer lube range materials can be obtained in accordance with the present invention in a single stage or in a two-stage process. Generally in a two stage process the first stage involves olgmerization of an inexpensive lower olefin of, e.g., propylene at about 200° C. over a surface poisoned HZSM-5. The second stage involves further olgmerization/interpolymerization of the product (or a fraction of the product) from the first stage over a second and/or different acid catalyst, which may be modified or unmodified as disclosed herein, at about 100°-260° C. The temperature of the second state, i.e., about 25°-75° C. lower and preferably the catalyst is an unmodified ZSM-5 type catalyst. Both high yields and high VI are achieved by this two-stage process. In a single stage process only the first stage of the two stage process is employed. Lubes of extremely high VI are produced, but at a lower yield.

Conventional temperatures, pressures and equipment may be used in the olgmerization process. Preferred temperatures may vary from about 100° to about 350° C., preferably 150° to 250° C. pressures from about atmospheric to 20,000 kPa (3000 psi) and WHSV from about 0.01 to about 2.0, preferably 0.2 to 1.0 are employed.

The reaction of, or addition to, alkyl nitriles with olefins or alkenes, is known to those skilled in the art as the Ritter reaction. This invention applies Ritter reaction chemistry to the unique alkenes prepared by oligomerization of lower alkenes, i.e. $C_2-C_8$ olefins, using surface deactivated ZSM-5 catalyst The reaction involves the nucleophilic addition of a nitrile to a carbenium ion in the presence of a strong acid, such as sulfuric acid, followed by addition of H+ to the complex in accordance with Markovnikov's rule to provide an amide of the structure:

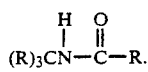

In the present invention the term amidation describes the foregoing reaction which results in the formation of an amide from a nitrile and an olefin in presence of or in contact with strong acid catalysis. The reaction can be further illustrated as follows for acetonitrile and isobutylene:

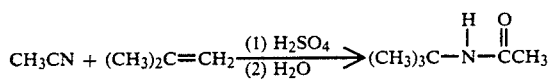

Typically, the addition of the nitrile moiety to the carbon atom of an olefin is influence by the carbenium ion intermediate stability such that addition to a tertiary carbon atom of an olefin is to be expected over addition to a secondary carbon atom. Accordingly, in the instant invention, where the oligomeric alkene contains olefin unsaturation where one of the olefin carbon atoms is a tertiary carbon atom, it can be expected that nitrile nitrogen addition will occur on that carbon atom.

Nitriles useful in the present invention include alkyl and aralkyl mono and dinitriles containing two to twenty carbon atoms including acetonitrile, propionitrile, butyronitrile, hexanonitrile, octanonitrile, oxalonitrile, malononitrile, succinonitrile, adiponitrile, phenylacetonitrile and the like. Hydrogen cyanide is also useful for amidation of oligomeric alkenes according to the process of the present invention.

Catalysts useful in the present invention include strong acids, preferably sulfuric acid of at least 90% concentration and more preferably greater then 96% concentration Boron trifluoride hydrate is also a useful catalyst, particularly where it is preferred to avoid sulfonation of alkene.

In the process carried out according to the present invention employing sulfuric acid as catalyst, alkyl nitriles and oligomeric alkenes as starting materials it has been found that both amidation and sulfonation reactions occur and result in the formation of alkene oligomers containing sulfonic acid groups as well as amide groups. It has further been discovered that the degree or ratio of sulfonation versus amidation of the alkene oligomer can be influenced significantly by reaction conditions, particularly reaction temperature. Sulfonation is favored at higher reaction temperature while lower reaction temperature enhances the formation of amides groups on the oligomer. The overall reaction temperature can be between −20° C. and 200° C. at subatmospheric, atmospheric or supra-atmospheric pressures. At temperatures significantly above 25° C. sulfonation is the dominant reaction and the ratio of sulfonic acid to amide groups increases. Temperatures below 25° C. favor amidation and the proportion of amides groups in the alkene oligomer is greater than sulfonic acid groups.

Preferably, the reaction is carried out batchwise by the addition of the alkene oligomer to a solution of the nitrile and catalyst. An inert solvent may also be used. The product is isolated by conventional means to provide the amidated and sulfonated oligomer in high yield. Infrared analysis of the product shows amide and sulfonic acid absorptions.

The combination of amide and sulfonic acid groups in the product provides unique advantages in the preparation of lubricant additives. Amides, in general, are known to improve dispersancy in lubricants while the sulfonic acid group can be converted to zinc and magnesium salts to impart detergency and antiwear properties to the lubes. The products of the invention show increased viscosity and somewhat reduced viscosity index and have potential as traction fluids due to the presence of polar groups. They show utility directly as additives to lubricating oils or indirectly as reactive intermediates for the production of further additives.

In one embodiment of the present invention when the preferred product comprises alkene oligomers containing only amide groups and no sulfonic acid groups $BF_3$ hydrate is used as catalyst and sulfonation is avoided. $BF_3$ hydrate is known to be an effective catalyst in the Ritter reaction as described in the aforementioned reference in Organic Reactions. The reaction conditions for $BF_3$ hydrate catalyzed amidation of the alkene oligomers employed in the present invention are, in general, similar to those used with sulfuric acid catalyst, i.e., temperatures between −20° C. and 250° C. with pressures at subatmospheric, atmospheric or supraatmospheric. The following prophetic Example 1 illustrates the instant invention employing boron trifluoride hydrate as catalyst to prepare amide derivatives of the alkene oligomer prepared as described herein.

EXAMPLE 1

Amidation of olefins having the average composition $C_{25}H_{50}$ is carried out at a temperature of about 35° C. To a rapidly stirred mixture of acetonitrile (0.075 mole) and $BF_3$ hydrate (0.1 mole) is added dropwise 0.05 mole of olefin. The product weighs 20 grams. The infrared spectrum shows amide carbonyl absorption at $1643 cm^{-1}$.

The following Examples illustrate the present invention employing sulfuric acid as catalyst.

EXAMPLE 2

Amidation-sulfonation of olefins having the average composition $C_{25}H_{50}$ is carried out at 45° C. To a rapidly stirred mixture of acetonitrile (3.08 g, 0.0750 mole) and sulfuric acid (19.62 g, 0.200 mole) is added dropwise 17.53 (0.0500 mole) olefin. The product weighs 20.10 g. The infrared spectrum shows an amide carbonyl absorption at $1643 cm^{-1}$, an amide N-H absorption at $3298 cm^{-1}$, and sulfonic acid absorptions at 1050 and $1198 cm^{-1}$. The elemental analysis of the product shows 0.62% nitrogen and 3.26% sulfur. The following table compares the viscometric properties of the starting olefin with those of the reaction product.

|  | Fresh | Product |
|---|---|---|
| Viscosity at 100° C. | 2.8 | 16.8 |
| Viscosity Index | 93 | 76 |

EXAMPLE 3

Amidation-sulfonation of olefins having the average composition $C_{25}H_{50}$ is carried out at 5–25° C. To a rapidly stirred mixture of acetonitrile (3.08 g, 0.0750 mole) and sulfuric acid (19.62 g, 0.200 mole) is added dropwise 17.53 (0.0500 mole) olefin. The product weighs 19.16 g and has the same infrared absorptions as the product of Example 2 except that the amide infrared absorptions are stronger and the sulfonic acid absorptions are weaker. The elemental analysis shows 1.25% nitrogen and 1.49% sulfur. The following table compares the viscometric properties of the starting olefin with those of the reaction product.

|  | Fresh | Product |
| --- | --- | --- |
| Viscosity at 100° C. | 2.8 | 7.6 |
| Viscosity Index | 93 | 20 |

It has been determined that the products of the instant invention produce novel lubricating mixtures when mixed with the hydrocarbon lubricants known in the art, including mineral oil and synthetic lubricants such as those derived from the oligomeriztion of alphaolefins in contact with cationic and Ziegler catalyst. The sulfonated and/or amidated oligomers can be added to the lubricants in amounts ranging from 0.1% to 99% by mixing. The mixtures may further contain lubricant additives taken from the group consisting of dispersants, detergents, viscosity index improvers, extreme pressure/antiwear additives, antioxidants, pour point depressants, emulsifiers, demulsifiers, corrosion inhibitors, antirust inhibitors, antistaining additives, friction modifiers, and the like.

While the instant invention has been described by specific examples and embodiments, there is no intent to limit the inventive concept except as set forth in the following claims.

What is claimed is:

1. A process for the production of liquid lubricant or lubricant additive comprising;
    contacting a mixture comprising an alkylnitrile and alkene oligomer containing greater than twenty carbon atoms with sulfuric acid catalyst under amidation and sulfonation reaction conditions, said alkene oligomer comprising the oligomerization product of lower alkene oligomerized in contact with medium pore, shape selective metallosilicate catalyst under oligomerization conditions;
    separating the reaction product and recovering said liquid lubricant or additive containing amide and sulfonic acid groups.

2. The process of claim 1 wherein said alkylnitrile includes mono and dinitriles containing one to twenty carbon atoms and said amidation and sulfonation reaction conditions comprise temperatures between −20° C. and 250° C.

3. The process according to claim 1 wherein said liquid lubricant or additive has a viscosity at 100° C. greater than 2cS and viscosity index measured at 100° C. greater than 75.

4. The process according to claim 1 wherein said metallosilicate catalyst comprises ZSM-5 catalyst.

5. The process according to claim 4 wherein the surface of said catalyst is rendered substantially inactive for acid reactions by treatment with a surface deactivating agent.

* * * * *